United States Patent
Nakajima et al.

(10) Patent No.: US 8,965,658 B2
(45) Date of Patent: Feb. 24, 2015

(54) VEHICLE CONTROLLER AND METHOD FOR CONTROLLING VEHICLE

(71) Applicant: Honda Motor Co., Ltd., Tokyo (JP)

(72) Inventors: Kenji Nakajima, Wako (JP); Youji Yasuoka, Wako (JP); Masafumi Amano, Wako (JP); Takayuki Yamasaki, Wako (JP); Kazuhiro Nakano, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 108 days.

(21) Appl. No.: 13/778,127

(22) Filed: Feb. 27, 2013

(65) Prior Publication Data
US 2013/0245911 A1    Sep. 19, 2013

(30) Foreign Application Priority Data

Mar. 19, 2012 (JP) ................... 2012-062467

(51) Int. Cl.
| | |
|---|---|
| *B60K 28/16* | (2006.01) |
| *B60W 30/18* | (2012.01) |
| *B60K 6/442* | (2007.10) |
| *B60W 10/06* | (2006.01) |
| *B60W 10/08* | (2006.01) |

(52) U.S. Cl.
CPC .......... *B60W 30/18172* (2013.01); *B60K 6/442* (2013.01); *B60K 28/16* (2013.01); *B60W 10/06* (2013.01); *B60W 10/08* (2013.01); *B60W 2520/263* (2013.01); *B60W 2720/28* (2013.01); *Y02T 10/6286* (2013.01); *Y02T 10/6234* (2013.01)
USPC ................................................ 701/84; 477/3

(58) Field of Classification Search
USPC ........... 701/84; 475/5; 477/3–4, 7, 9; 74/335, 74/661; 180/65.1, 65.21, 65.26, 65.285, 180/65.7
See application file for complete search history.

(56) References Cited

U.S. PATENT DOCUMENTS

| | | | | |
|---|---|---|---|---|
| 5,368,120 | A * | 11/1994 | Sakai et al. .................... | 180/197 |
| 6,542,806 | B1 * | 4/2003 | Suhre et al. ..................... | 701/82 |
| 8,473,138 | B2 * | 6/2013 | Maki ............................... | 701/22 |
| 2011/0036652 | A1 | 2/2011 | Honda et al. | |

FOREIGN PATENT DOCUMENTS

JP    3951494 B2    9/2000

* cited by examiner

*Primary Examiner* — Dalena Tran
(74) *Attorney, Agent, or Firm* — Mori & Ward, LLP

(57) ABSTRACT

A vehicle controller includes a wheel speed sensor, a skid sensor, an upper limit calculator, and a motive power controller. The wheel speed sensor is configured to detect rotational speed of driving wheels. The skid sensor is configured to determine whether or not the driving wheels are skidding based on an output of the wheel speed sensor. The upper limit calculator is configured to calculate an upper limit of rotational speed of the driving wheels if the skid sensor determines that the driving wheels are skidding. The motive power controller is configured to control motive power output from the driving source so that rotational speed of the driving wheels is equal to or smaller than the upper limit calculated by the upper limit calculator.

14 Claims, 3 Drawing Sheets

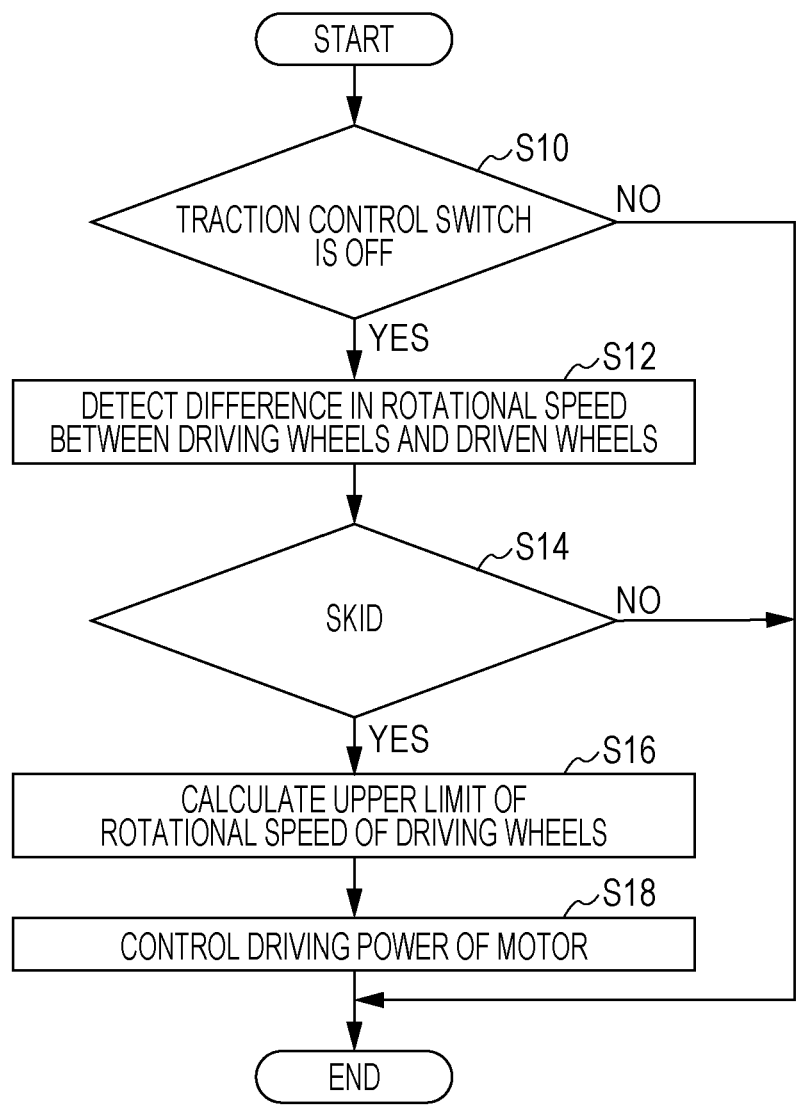

VEHICLE CONTROLLER AND METHOD FOR CONTROLLING VEHICLE

CROSS-REFERENCE TO RELATED APPLICATIONS

The present application claims priority under 35 U.S.C. §119 to Japanese Patent Application No. 2012-062467, filed Mar. 19, 2012, entitled "Vehicle Controller." The contents of this application are incorporated herein by reference in their entirety.

BACKGROUND OF THE INVENTION

1. Field of the Invention

The present disclosure relates to a vehicle controller and a method for controlling a vehicle.

2. Discussion of the Background

While a vehicle is running, motive power is output from a driving source in the vehicle and transmitted to a power transmission mechanism having an input shaft and an output shaft that rotates driving wheels of the vehicle. In such a vehicle, when inertial torque acting on the output shaft is relatively high, excessive inertial torque may sometimes be generated on the output shaft of the power transmission mechanism when the vehicle moves by skidding from low-friction surface area to high-friction surface area and the driving wheels hold the high-friction road surface.

In Japanese Patent No. 3951494, described is a technique that determines whether or not a friction coefficient of a low-friction road surface, on which a vehicle with an electric motor serving as a driving source is running, is lower than a predetermined value. If the vehicle is running on a low-friction road surface, regenerative torque or assist torque is changed to prevent the driving wheels from skidding.

SUMMARY OF THE INVENTION

According to one aspect of the present invention, a vehicle controller includes a wheel speed sensor, a skid sensor, an upper limit calculator, and a motive power controller. The wheel speed sensor is configured to detect rotational speed of driving wheels to which motive power is transmitted from a driving source through a power transmission mechanism including an input shaft and an output shaft. The input shaft is connected to the driving source. The output shaft is connected to the input shaft through a gear. The skid sensor is configured to determine whether or not the driving wheels are skidding based on an output of the wheel speed sensor. The upper limit calculator is configured to calculate an upper limit of rotational speed of the driving wheels if the skid sensor determines that the driving wheels are skidding. The motive power controller is configured to control motive power output from the driving source so that rotational speed of the driving wheels is equal to or smaller than the upper limit calculated by the upper limit calculator.

According to another aspect of the present invention, in a method for controlling a vehicle, rotational speed of driving wheels is detected. Motive power is transmitted from a driving source to the driving wheels through a power transmission mechanism including an input shaft and an output shaft. The input shaft is connected to the driving source. The output shaft is connected to the input shaft through a gear. It is determined whether or not the driving wheels are skidding based on the rotational speed detected in the detecting of the rotational speed. An upper limit of rotational speed of the driving wheels is calculated if it is determined that the driving wheels are skidding. Motive power output from the driving source is controlled so that rotational speed of the driving wheels is equal to or smaller than the upper limit calculated in the calculating of the upper limit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 2 is a flowchart illustrating operation of the vehicle controller illustrated in FIG. 1.

DESCRIPTION OF THE EMBODIMENTS

Figure 1:
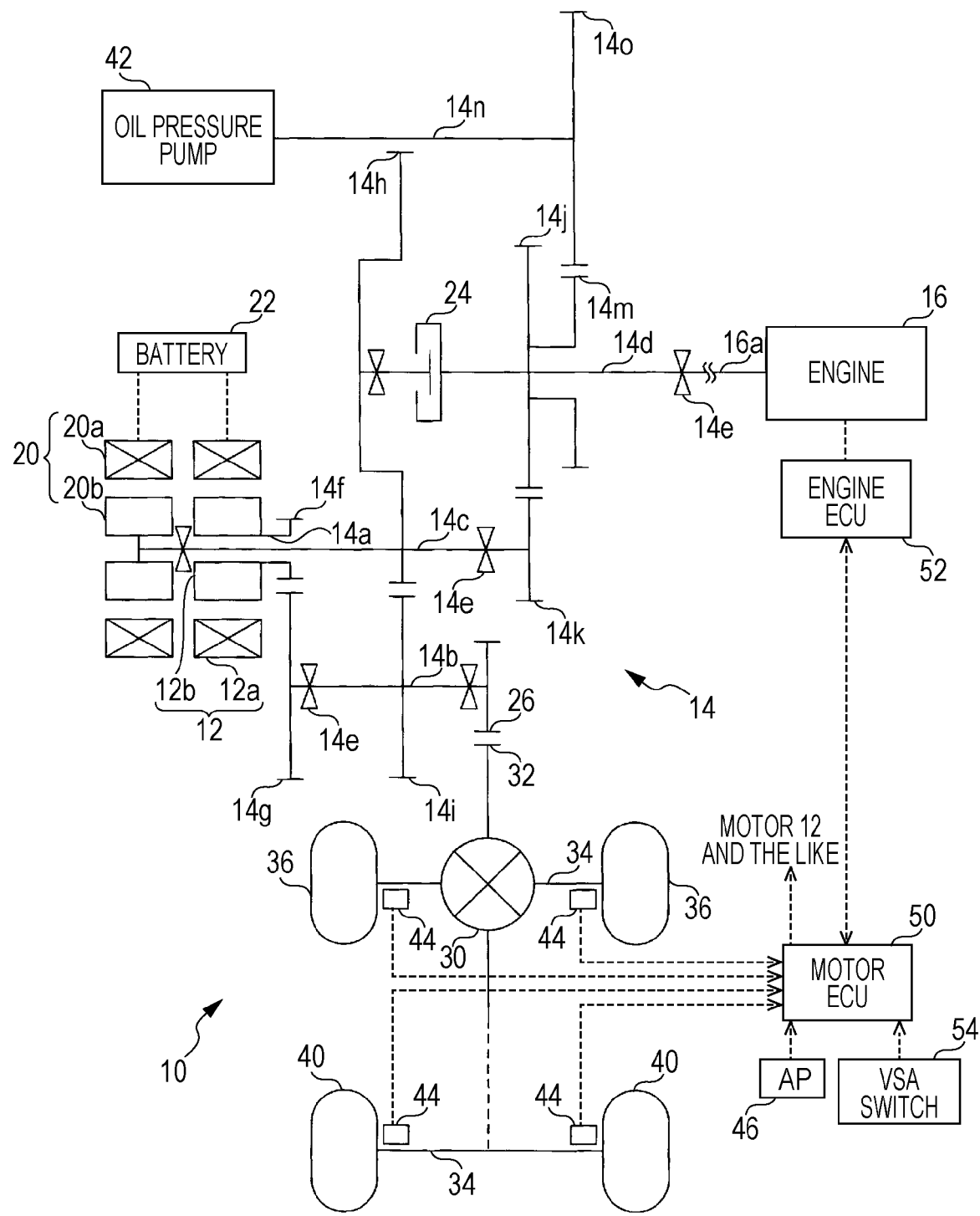
FIG. 1 is a schematic diagram illustrating the entirety of a vehicle controller according to an embodiment.

The embodiments will now be described with reference to the accompanying drawings, wherein like reference numerals designate corresponding or identical elements throughout the various drawings.

FIG. 1 is a schematic diagram illustrating the entirety of a vehicle controller according to the embodiment.

As illustrated in FIG. 1, a vehicle 10 is a hybrid vehicle including a motor (an electric motor or a driving source) 12, a power transmission mechanism 14, an engine (an internal combustion engine or a driving source) 16, and a generator (a power generator) 20. The motor 12 and the generator 20 are connected to each other with a battery 22 interposed therebetween.

The motor 12 is a brushless motor (alternator) and functions as an electric motor that rotates when power is applied thereto and thus provides a driving force (more specifically, the motor 12 also functions as a motor-generator having a regenerative function by which the motor 12 generates electric power by being rotated by the rotations of the driving wheels when the vehicle 10 decelerates). The motor 12 is provided with a stator 12a fixed to a case (not illustrated) of the power transmission mechanism 14 and a rotor 12b disposed so as to be able to rotate relative to the stator 12a.

The engine 16 is, for example, an internal combustion engine that uses gasoline for fuel. In the engine 16, intake air regulated by a throttle valve flows through an intake manifold, mixes with fuel injected from an injector in the vicinity of an intake port of each cylinder and forms an air-fuel mixture, and the mixture flows to a combustion chamber of each cylinder when an intake valve is opened.

The air-fuel mixture is ignited and combusts in each combustion chamber of the engine 16, thereby driving a piston so as to rotate a crankshaft, and thereafter is discharged outside the engine 16 as exhaust. The crankshaft is connected to an output shaft 16a.

The generator 20 is also the alternator and is provided with a stator 20a fixed to the case (not illustrated) of the power transmission mechanism 14 and a rotor 20b that is disposed so as to be able to rotate relative to the stator 20a.

The power transmission mechanism 14 includes a first input shaft (motor shaft) 14a connected to the rotor 12b of the motor 12, an output shaft (idler shaft) 14b, a second input shaft (generator shaft) 14c coaxially disposed inside the input shaft 14a and connected to the rotor 20a of the generator 20, and a third input shaft (engine shaft) 14d connected to the output shaft 16a of the engine 16.

In the power transmission mechanism 14, the first input shaft 14a, the output shaft 14b, the second input shaft 14c, and the third input shaft 14d are supported in a rotatable manner with bearings 14e in the inside of the case (not illustrated).

A driving gear 14f is attached to the first input shaft 14a while a driven gear 14g engageable with the driving gear 14f is attached to the output shaft 14b. Accordingly, rotation of the first input shaft 14a is transmitted to the output shaft 14b through the gears 14f and 14g.

A clutch 24 and a driving gear 14h are attached to the third input shaft 14d on the same axial line while a driven gear 14i engageable with the driving gear 14h is attached to the output shaft 14b. Accordingly, rotation of the third input shaft 14d is transmitted to the output shaft 14b through the gears 14h and 14i when the clutch 24 is engaged. In the clutch 24, which is a wet multiple-plate clutch, clutch plates are pushed against clutch disks by applied pressure (oil pressure) when operating oil is supplied to a piston chamber.

The clutch 24 allows the rotation of the third input shaft 14d on the front and rear sides of the clutch 24 to be connected (transmitted) when the operating oil is supplied to the piston chamber, in this case the clutch 24 is in an engaged state (on), whereas the clutch causes the rotation on the front and rear sides of the clutch 24 to be disconnected (released) when no operating oil is supplied to the piston chamber, in this case the clutch 24 is in a released state (off).

A driving gear 14j is attached to the third input shaft 14d while a driven gear 14k engageable with the driving gear 14j is attached to the second input shaft 14c. Accordingly, rotation of the third input shaft 14d is transmitted to the second input shaft 14c through the gears 14j and 14k.

A final driving gear 26 is attached to the output shaft 14b while a final driven gear 32 engageable with the final driving gear 26 is attached to a differential mechanism 30. Accordingly, rotation of the output shaft 14b is transmitted to the differential mechanism 30 through the gears 26 and 32.

The differential mechanism 30 is connected to left and right driving wheels 36 with a driving shaft 34 interposed therebetween. The rotation input from the output shaft 14b is distributed by the differential mechanism 30 and transmitted to the driving wheels 36. In addition to the driving wheels (front wheels) 36, the vehicle 10 is provided with driven wheels (rear wheels) 40 rotating following the rotation of the driving wheels 36.

A driving gear 14m is attached to the third input shaft 14d. The driving gear 14m engages with a driven gear 14o attached to a shaft 14n. The shaft 14n connects to an oil pressure pump (oil transfer pump) 42.

In the embodiment, the motor 12 is connected to the driving wheels 36 so as to disable the connection to be disconnected through the power transmission mechanism 14, more specifically, through the first input shaft 14a, the driving gear 14f, the driven gear 14g, the output shaft 14b, and the like and the power transmission mechanism 14 can provide any one or both of the following two modes. One is a motor running (series operation) mode in which the power of the motor 12 is transmitted to the driving wheels 36 to move the vehicle 10. The other one is an engine running (parallel operation) mode in which the power of the engine 16 is transmitted to the driving wheels 36 to move the vehicle 10.

In the motor running mode, the power of the engine 16 is transmitted to the second input shaft 14c through the third input shaft 14d and the gears 14j and 14k. The transmitted power causes the generator 20 to rotate in such a manner that the rotor 20b rotates relative to the stator 20a. As a result, the generator 20 outputs electric power (generates electric power). In this mode, the clutch 24 is in a released state (off) because no operating oil is supplied thereto.

The output of the generator 20 is supplied, through the battery 22 (or directly), to the motor 12 and causes the rotor 12b to rotate relative to the stator 12a. The rotation of the rotor 12b is transmitted to the output shaft 14b from the first input shaft 14a through the gears 14f and 14g, and further transmitted to the driving wheels 36 through the gears 26 and 32, the differential mechanism 30, and the driving shaft 34 to move the vehicle 10.

In the engine running mode, once the engine 16 is operated and the operating oil is supplied to the clutch 24 so as to be in the engaged state, the power of the engine 16 is transmitted to the output shaft 14b from the third input shaft 14d through the gears 14h and 14i, and further transferred to the driving wheels 36 through the gears 26 and 32, the differential mechanism 30, and the driving shaft 34 to move the vehicle 10.

In this mode, the parallel operation is also available in which the motor 12 driven by the electric power output from the generator 20 assists the engine 16 in moving the vehicle 10 because the third input shaft 14d is connected to the second input shaft 14c through the gears 14j and 14k and thus the rotation of the engine 16 is input to the generator 20, causing the generator 20 to generate electric power.

When the engine 16 operates, the oil pressure pump 42 is also driven and discharges oil pressure to an oil supply mechanism (not illustrated) because the third input shaft 14d is connected to the oil pressure pump 42 through the gear 14m, the shaft 14n, and the gear 14o.

Other components are described below. In the vehicle 10, wheel speed sensors 44 are arranged near the driving shafts 34 of the driving wheels 36 and the driven wheels 40. The wheel speed sensors 44 output pulse signals every predetermined rotation of each of the driving wheels 36 and the driven wheels 40.

An AP opening sensor 46 is disposed near an accelerator pedal on a vehicle floor on a driver's seat (not illustrated) side and produces an output corresponding to an opening (a depression amount) AP of the accelerator pedal operated by a driver. In addition, many sensors (not illustrated) that detect operation states of the motor 12, the generator 20, and the battery 22, for example, are provided in the vehicle 10.

The outputs of the sensors 44 and 46 are sent to a motor ECU 50, for example. The motor ECU 50 includes a microcomputer having a central processing unit (CPU), a read only memory (ROM), a random access memory (RAM), and an input-output (I/O) port and controls the operation of the motor 12, for example.

The engine 16 includes an engine ECU 52. The engine ECU 52 also includes a microcomputer having a CPU, a ROM, a RAM, and an I/O port, and many sensors detecting operation states of the engine 16, and controls the operation of the engine 16 on the basis of the outputs of the sensors. The motor ECU 50 and the engine ECU 52 can exchange information by communicating with each other.

The motor ECU 50 executes vehicle stability assist control including antiskid braking system (ABS) control and traction control. In the ABS control, the motor ECU 50 obtains a difference in rotational speed between the driving wheels 36 and the driven wheels 40 from the outputs of the wheel speed sensors 44 and determines whether the driving wheels 36 are skidding (slipping) on a road surface, and if it is determined that the driving wheels 36 are skidding, reduces the power of the motor 12(or the engine 16). In the traction control, the motor ECU 50 controls the driving power of the driving wheels 36. A traction control switch 54 that enables (on) or disables (off) the traction control to be executed is provided at the driver's seat of the vehicle 10 so as to allow a driver to readily operate the traction control switch 54. The output of the traction control switch 54 is also input to the motor ECU 50.

The operation of the vehicle controller, more specifically, the operation of the motor ECU 50, is described below.

FIG. 2 is a flowchart illustrating the operation.

In S10, the motor ECU 50 determines whether the traction switch 54 is off, i.e., a driver operates the traction switch 54 to an off (disabled) position or a driver prohibits traction control from being executed.

If it is determined that the traction switch 54 is not off in S10, the succeeding processing is skipped while if it is determined that the traction switch 54 is off in S10, the processing proceeds to S12, in which the motor ECU 50 detects the rotational speeds of the driving wheels 36 and the driven wheels 40. That is, the motor ECU 50 detects the rotational speeds of the driving wheels 36 and the driven wheels 40 from the outputs of the wheel speed sensors 44.

Then, the processing proceeds to S14, in which the motor ECU 50 determines whether the driving wheels 36 are skidding (slipping) on a road surface. That is, in S14, the motor ECU 50 calculates a difference in rotational speed between the driving wheels 36 and the driven wheels 40 read in S12 and determines whether the calculated difference exceeds a predetermined value, and if the calculated difference exceeds the predetermined value, determines that the driving wheels 36 are skidding (slipping) on the road surface.

In the processing in S14, the motor ECU 50 may compare the detected rotational speeds of the driving wheels 36 with a predetermined value set as needed and determine that the driving wheels 36 are skidding on the road surface if the rotational speeds of the driving wheels 36 exceed the predetermined value. That is, the motor ECU 50 may detect the rotational speeds of at least the driving wheels 36 out of the driving wheels 36 and the driven wheels 40 and determine whether the driving wheels 36 are skidding on the basis of the rotational speeds of the driving wheels 36.

If the motor ECU 50 determines that the driving wheels 36 are not skidding in S14, the succeeding processing is skipped whereas if the motor ECU 50 determines that the driving wheels 36 are skidding in S14, the processing proceeds to S16, in which the motor ECU 50 calculates an upper limit of rotational speed of the driving wheels 36.

Then, the processing proceeds to S18, in which the motor ECU 50 controls (limits) the driving power (output) of the motor 12. More specifically, the motor ECU 50 controls (limits) the driving power (output) of the motor 12 such that the rotational speeds of the driving wheels 36 are equal to or smaller than the calculated upper limit of rotational speed. In the engine running mode, the motor ECU 50 controls (limits) the driving power (output) of the engine 16 (and the motor 12 in the parallel operation) such that the rotational speeds of the driving wheels 36 are equal to or smaller than the calculated upper limit of rotational speed.

Specifically, the upper limit of rotational speed is calculated on the basis of an allowable torque calculated from the allowable rotational inertial torque of the output shaft 14b of the power transmission mechanism 14 illustrated in FIG. 1 and the difference in rotational speed between the driving wheels 36 and the driven wheels 40.

More specifically, the allowable torque is a fixed value calculated on the basis of a strength of the power transmission mechanism 14 of the vehicle 10 obtained by experiments, for example. The difference in rotational speed of the driving wheels 36 and the driven wheels 40 is set to 30 km/h, for example.

FIGS. 3A to 3D are time charts describing the processing of the flowchart of FIG. 2.

Figure 3A:
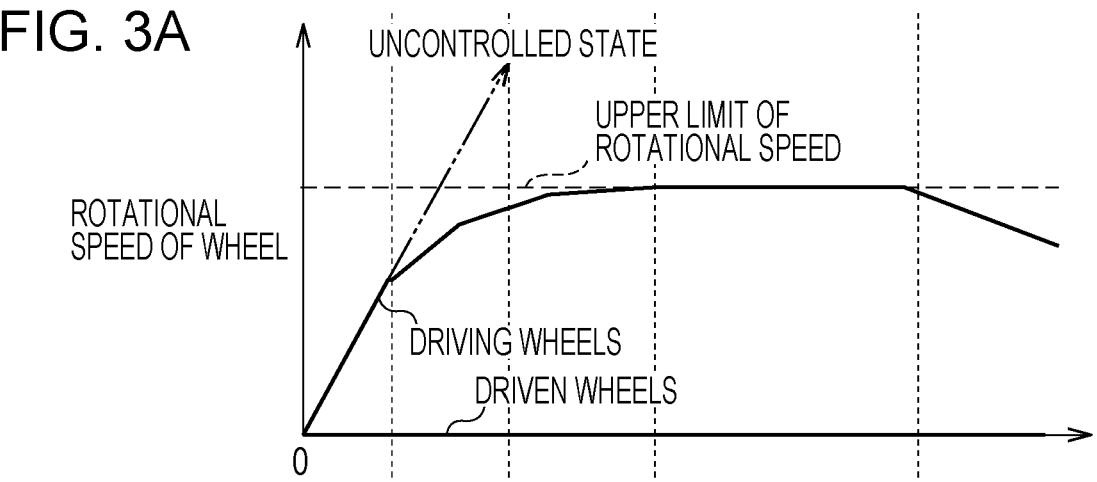
FIGS. 3A to 3D are time charts describing the processing of the flowchart illustrated in FIG. 2.
Figure 3B:
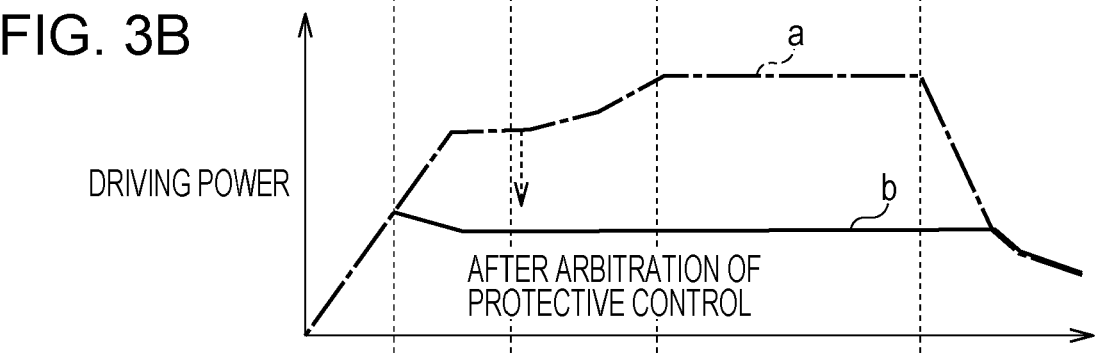
Figure 3C:
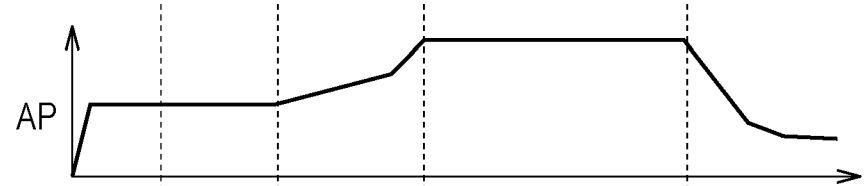
Figure 3D:
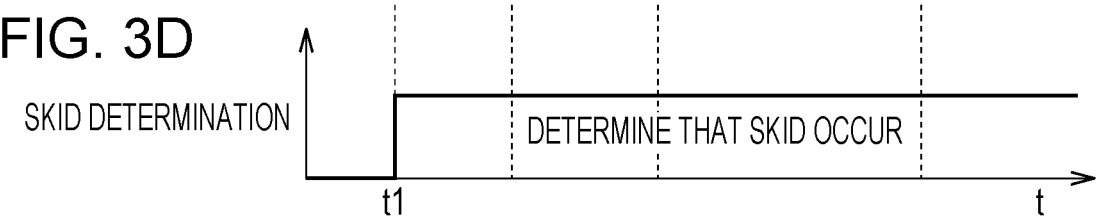

When it is determined that the driving wheels 36 are skidding at time t1 as illustrated in FIG. 3D, the rotational speeds of the driving wheels 36 are controlled (limited) to be equal to or smaller than the upper limit of rotational speed as illustrated in FIG. 3A.

As a result, the driving power output from the motor (or the engine 16) is controlled along a characteristic curve indicated by the solid line in FIG. 3B even though the required driving power increases with an increase in the opening AP of the accelerator pedal following the driver's operation of the accelerator pedal as illustrated in FIG. 3C.

In the vehicle 10 having the structure as illustrated in FIG. 1, a relatively large inertial torque acts on the output shaft 14b of the power transmission mechanism 14. Accordingly, excessive inertial torque sometimes acts on the output shaft 14b of the power transmission mechanism 14, in particular, the bearing 14e supporting the output shaft 14b when the driving wheels 36 hold a high-friction load surface after skidding on a low-friction road surface. The embodiment thus structured can avoid such a problem.

The structure illustrated in FIG. 3B prevents the driving power from increasing as indicated with "a" following the increase in opening AP of the accelerator pedal as illustrated in FIG. 3C. When the driving power required by a driver is reduced by decreasing the opening AP of the accelerator pedal, the output driving power is reduced as indicated with "b" in accordance with the decrease in required driving power.

In the embodiment described above, the controller of the vehicle 10, which includes the driving sources (the motor 12 and the engine 16) mounted therein; and the power transmission mechanism 14 having at least the input shafts (the first input shaft 14a and the third input shaft 14d) connected to the driving sources and the output shaft 14b connected to the input shafts through the gears (the driving gear 14f, the driven gear 14g, the driving gear 14h, and the driven gear 14i), and transmits the power output from the driving sources to the driving wheels 36 from the power transmission mechanism so as to move the vehicle 10, includes the following: the wheel speed sensors (the wheel speed sensors 44, and the motor ECU 50 in S12) that detect the rotational speeds of at least the driving wheels 36 out of the driving wheels 36 and the driven wheels 40 rotating following the rotation of the driving wheels 36, the skid sensor (the motor ECU 50 in S14) that determines whether the driving wheels 36 are skidding on the basis of the outputs of the wheel speed sensors, the upper limit calculator (the motor ECU 50 in S16) that calculates the upper limit of rotational speed of the driving wheels when the skid sensor determines that the driving wheels are skidding, and the power controller (the ECU 50 in S18) that controls the power (driving power) output from the driving sources such that the rotational speeds of the driving wheels are equal to or smaller than the upper limit of rotational speed calculated by the upper limit calculator. As a result, in the vehicle 10 including the power transmission mechanism 14 that receives the power (driving power) output from the driving sources such as the motor 12 and transmits the power to the driving wheels 36 from the output shaft 14b and in which a relatively large inertial torque acts on the output shaft 14b, the controller can prevent the inertial torque from excessively acting on the output shaft 14b (e.g., the bearing 14e). Furthermore, the controller can prevent an unnecessary increase in strength of the power transmission mechanism 14.

The driving source (the motor 12) is connected to the driving wheels 36 through the power transmission mechanism 14 so as to disable the connection to be disconnected, i.e., connected without interposing the clutch 24, for example, therebetween. Accordingly, also in the vehicle 10 in which the inertial torque from the motor 12 directly acts on the output shaft 14b as illustrated in FIG. 1, the inertial torque can be prevented from being excessively acting on the output shaft 14b.

The upper limit calculator calculates the upper limit of rotational speed on the basis of the allowable torque calculated from the allowable rotational inertial torque of the output shaft 14b of the power transmission mechanism 14 and the difference in rotational speed between the driving wheels 36 and the driven wheels 40 (the motor ECU 50 in S16). In addition to the above effect, the upper limit of rotational speed can be properly calculated, thereby preventing the inertial torque from excessively acting on the output shaft 14b.

In the embodiment, a hybrid vehicle is exemplified as the vehicle 10. The embodiment, however, is not limited to a hybrid vehicle. Any vehicle is applicable that transmits power output from a driving source mounted therein to driving wheels from a power transmission mechanism having an input shaft and an output shaft so as to move the vehicle and in which a relatively high inertial torque acts on the output shaft. It is needless say that the front wheels and the rear wheels are not limited to those in the exemplified structure in which the front wheels are the driving wheels 36 and the rear wheels are the driven wheels 40.

According to an aspect of the embodiment, in a vehicle that includes a vehicle controller, a driving source mounted therein, and a power transmission mechanism having at least an input shaft connected to the driving source and an output shaft connected to the input shaft through a gear and that receives motive power output from the driving source and transmits the motive power to driving wheels from the power transmission mechanism so as to move the vehicle, the vehicle controller includes a wheel speed sensor that detects rotational speed of at least the driving wheels out of the driving wheels and driven wheels rotating following the rotation of the driving wheels, a skid sensor that determines whether or not the driving wheels are skidding on the basis of an output of the wheel speed sensor, an upper limit calculator that calculates an upper limit of rotational speed of the driving wheels when the skid sensor determines that the driving wheels are skidding, and a motive power controller that controls the motive power output from the driving source such that the rotational speed of the driving wheels is equal to or smaller than the upper limit calculated by the upper limit calculator. Accordingly, in the vehicle including the power transmission mechanism that receives the motive power output from the driving source and transmits the motive power to the driving wheels from the output shaft and in which a relatively large inertial torque acts on the output shaft, the vehicle controller thus structured can prevent the inertial torque from excessively acting on the output shaft. Furthermore, the vehicle controller can prevent an unnecessary increase in strength of the power transmission mechanism.

In the vehicle controller according to the embodiment, the driving source may be inseparably connected to the driving wheels through the power transmission mechanism. In this way, the driving source is inseparably connected to the driving wheels through the power transmission mechanism, that is, connected to the driving wheels without interposing a clutch and so on therebetween. As a result, in the vehicle in which inertial torque from the driving source directly acts on the output shaft of the power transmission mechanism, the vehicle controller thus structured can prevent the inertial torque from excessively acting on the output shaft.

In the vehicle controller according to the embodiment, the upper limit calculator may calculate the upper limit of rotational speed on the basis of an allowable torque calculated from an allowable rotational inertial torque of the output shaft of the power transmission mechanism and a difference in rotational speed between the driving wheels and the driven wheels. Accordingly, the vehicle controller thus structured can properly calculate the upper limit of rotational speed, thereby the inertial torque can be prevented from excessively acting on the output shaft.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicle controller comprising:
a wheel speed sensor configured to detect rotational speed of driving wheels to which motive power is transmitted from a driving source through a power transmission mechanism including an input shaft and an output shaft, the input shaft being connected to the driving source, the output shaft being connected to the input shaft through a gear;
a skid sensor configured to determine whether or not the driving wheels are skidding based on an output of the wheel speed sensor;
an upper limit calculator configured to calculate an upper limit of rotational speed of the driving wheels if the skid sensor determines that the driving wheels are skidding; and
a motive power controller configured to control motive power output from the driving source so that rotational speed of the driving wheels is equal to or smaller than the upper limit calculated by the upper limit calculator,
wherein the wheel speed sensor is configured to detect rotational speed of driven wheels, and
wherein the upper limit calculator calculates the upper limit of rotational speed based on
an allowable torque calculated from an allowable rotational inertial torque of the output shaft of the power transmission mechanism, and
a difference in rotational speed between the driving wheels and the driven wheels.

2. The vehicle controller according to claim 1, wherein the driving source is inseparably connected to the driving wheels through the power transmission mechanism.

3. The vehicle controller according to claim 1, wherein the skid sensor determines that the driving wheels are skidding if a difference in rotational speed between the driving wheels and the driven wheels exceeds a predetermined value.

4. The vehicle controller according to claim 1, wherein the allowable torque is a fixed value calculated based on strength of the power transmission mechanism.

5. The vehicle controller according to claim 1, wherein the motive power controller is configured to control motive power output from the driving source so that rotational speed of the driving wheels is equal to or smaller than the upper limit when a traction control switch is turned off.

6. The vehicle controller according to claim 1, wherein the motive power controller is configured to control motive power output from the driving source so that rotational speed of the driving wheels is equal to or smaller than the upper limit only when a traction control switch is turned off.

7. A vehicle controller comprising:
  wheel speed detecting means for detecting rotational speed of driving wheels to which motive power is transmitted from a driving source through a power transmission mechanism including an input shaft and an output shaft, the input shaft being connected to the driving source, the output shaft being connected to the input shaft through a gear;
  skid determination means for determining whether or not the driving wheels are skidding based on an output of the wheel speed detecting means;
  upper limit calculating means for calculating an upper limit of rotational speed of the driving wheels if the skid determination means determines that the driving wheels are skidding; and
  motive power controlling means for controlling motive power output from the driving source so that rotational speed of the driving wheels is equal to or smaller than the upper limit calculated by the upper limit calculating means,
  wherein the wheel speed detecting means is configured to detect rotational speed of driven wheels, and
  wherein the upper limit calculating means calculates the upper limit of rotational speed based on
    an allowable torque calculated from an allowable rotational inertial torque of the output shaft of the power transmission mechanism, and
    a difference in rotational speed between the driving wheels and the driven wheels.

8. The vehicle controller according to claim 7, wherein the allowable torque is a fixed value calculated based on strength of the power transmission mechanism.

9. The vehicle controller according to claim 7, wherein the motive power controlling means is configured to control motive power output from the driving source so that rotational speed of the driving wheels is equal to or smaller than the upper limit when a traction control switch is turned off.

10. The vehicle controller according to claim 7, wherein the motive power controlling means is configured to control motive power output from the driving source so that rotational speed of the driving wheels is equal to or smaller than the upper limit only when a traction control switch is turned off.

11. A method for controlling a vehicle, comprising:
  detecting rotational speed of driving wheels to which motive power is transmitted from a driving source through a power transmission mechanism including an input shaft and an output shaft, the input shaft being connected to the driving source, the output shaft being connected to the input shaft through a gear;
  detecting rotational speed of driven wheels;
  determining whether or not the driving wheels are skidding based on the rotational speed detected in the detecting of the rotational speed;
  calculating an upper limit of rotational speed of the driving wheels if it is determined that the driving wheels are skidding; and
  controlling motive power output from the driving source using a motive power controller so that rotational speed of the driving wheels is equal to or smaller than the upper limit calculated in the calculating of the upper limit,
  wherein the upper limit calculated in the calculating of the upper limit is based on
    an allowable torque calculated from an allowable rotational inertial torque of the output shaft of the power transmission mechanism, and
    a difference in rotational speed between the driving wheels and the driven wheels.

12. The method according to claim 11, wherein the allowable torque is a fixed value calculated based on strength of the power transmission mechanism.

13. The method according to claim 11, wherein the motive power controller is configured to control motive power output from the driving source so that rotational speed of the driving wheels is equal to or smaller than the upper limit when a traction control switch is turned off.

14. The method according to claim 11, wherein the motive power controller is configured to control motive power output from the driving source so that rotational speed of the driving wheels is equal to or smaller than the upper limit only when a traction control switch is turned off.

* * * * *